G. A. ENGLUND.
DRILL CHUCK.
APPLICATION FILED NOV. 2, 1920.
1,369,412.
Patented Feb. 22, 1921.
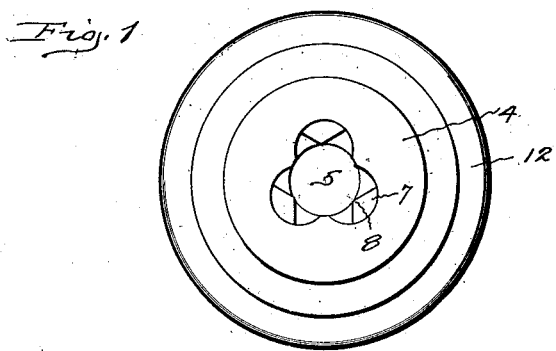
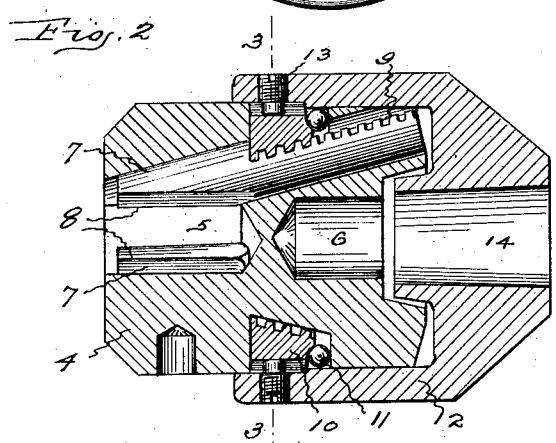
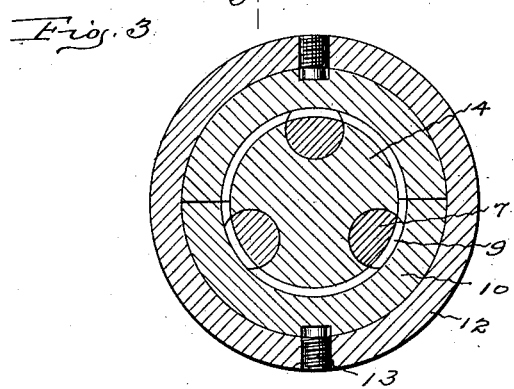
Inventor:
Gustaf A Englund
by
Harry R. Williams
atty.

UNITED STATES PATENT OFFICE.

GUSTAF A. ENGLUND, OF HARTFORD, CONNECTICUT, ASSIGNOR TO THE JACOBS MANUFACTURING COMPANY, OF HARTFORD, CONNECTICUT, A CORPORATION OF CONNECTICUT.

DRILL-CHUCK.

1,369,412.  Specification of Letters Patent.   Patented Feb. 22, 1921.

Application filed November 2, 1920. Serial No. 421,268.

*To all whom it may concern:*

Be it known that I, GUSTAF A. ENGLUND, a citizen of the United States, residing at Hartford, in the county of Hartford and State of Connecticut, have invented a new and useful Improvement in Drill-Chucks, of which the following is a specification.

This invention relates to the class of self-tightening drill chucks, that is, those chucks which are so constructed that the jaws will be closed by the forward rotation of the spindle of the drill press or lathe to which the chuck is applied and that tend to grip more firmly upon the drill shank as resistance to work increases.

The object of the invention is to provide a chuck of this character which is simple and cheap to manufacture, and the jaws of which will close very tightly upon and yet will open easily from the shank of a drill.

In attaining this end the jaws which are arranged in oblique bores in the body are provided with left hand threads and are engaged by a sectional nut with a corresponding thread that is rotatable on the body and is connected with a rotatable sleeve which is designed to be directly attached to the spindle of the machine with which the chuck is to be used.

In the accompanying drawings Figure 1 is a front end view of a chuck which embodies the invention. Fig. 2 is a central longitudinal section of the chuck. Fig. 3 is a transverse section on the plane indicated by the dotted line 3—3 on Fig. 2.

The body 4 of the chuck which is illustrated is cylindrical in shape and has an axial drill socket 5 at the front end and axial clearance opening 6 at the back end for the end of the spindle.

The jaws 7, of which there are three in the chuck shown, are located in obliquely formed bores in the body. These jaws are formed from a cylindrical rod with angular gripping edges 8 at their front ends extending into the drill socket and with left hand threads 9 in the outer surfaces of their shanks. Located in an annular groove in the outer surface of the body is a nut 10. This nut is formed in sections, usually two, and has a left hand thread formed to fit the threads on the jaw shanks. Back of the nut is an annular row of balls 11 which form a thrust bearing between the nut and the body.

The sleeve 12 that is cup-shaped is fitted to turn upon the body. This sleeve extends over the nut and is provided with set screws 13 which pass through the sleeve into slots in the edge of the nut so as to key these parts together. The rear or closed end of the cup-shaped sleeve has an opening 14, usually tapering, shaped to fit the end of the spindle of the drill press or lathe with which the chuck is to be used.

Turning the sleeve forward or in the direction of rotation of the machine spindle and holding the body by gripping the exposed end, rotates the nut and causes the jaws to move forward and close together. Thus when the chuck is on a rotating spindle and a drill is thrust into the body between the jaws and the body is held, the jaws will be closed upon the drill shank and all resistance to the rotation of the drill, as when it is at work upon a piece of metal, tends to further tighten the jaws upon the drill. With the balls arranged between the body and the back of the nut so as to resist the thrust incident to closing the jaws, a very tight grip can be obtained with but a slight expenditure of force. The balls also relieve the friction to such an extent that the jaws can be easily opened by either turning the sleeve backward or turning the body forward and holding the other member.

The invention claimed is:—

1. A drill chuck comprising a body, jaws movable longitudinally in the body, said jaws having threaded shanks, a nut turning on the body and having threads engaging the threaded shanks of the jaws, a sleeve rotatably fitted on the body, said sleeve having means for connection with and rotation by a machine spindle, and means connecting the sleeve and nut so that the rotation of the sleeve rotates the nut.

2. A drill chuck comprising a body, jaws movable longitudinally in the body, said jaws having threaded shanks, a nut turning within the body and having threads engaging the threaded shanks of the jaws, balls arranged between the back face of the nut and the body, a sleeve rotatably fitted on the body, said sleeve having means for connection with and rotation by a machine spindle, and means connecting the sleeve and nut so that the rotation of the sleeve rotates the nut.

3. A drill chuck comprising a body, jaws movable longitudinally in the body, said jaws having left hand threads on the outer surfaces of their shanks, a nut turning on the body and having a left hand thread engaging the threaded shanks of the jaws, a sleeve rotatably fitted on the body, said sleeve having means for connection with and rotation by a machine spindle, and means connecting the sleeve and nut so that the rotation of the sleeve rotates the nut.

4. A drill chuck comprising a body, jaws movable longitudinally in the body, said jaws having threaded shanks, a sectional nut turning in a groove in the body and having threads engaging the threaded shanks of the jaws, a sleeve rotatably fitted on the body, said sleeve having means for connection with and rotation by a machine spindle, and means connecting the sleeve and nut so that the rotation of the sleeve rotates the nut.

5. A drill chuck comprising a body, jaws movable longitudinally in the body, said jaws having threaded shanks, a nut turning on the body and having threads engaging the threaded shanks of the jaws, and a sleeve rotatably fitted on the body and adapted to rotate the nut, said sleeve extending about the rear of the body and having means whereby it may be secured to a machine spindle.

GUSTAF A. ENGLUND.